United States Patent [19]

Topolski

[11] Patent Number: 5,569,396
[45] Date of Patent: Oct. 29, 1996

[54] METHOD FOR MAKING ALLOYING ADDITIONS TO THE WELD OVERLAY WELD POOL

[75] Inventor: Mark J. Topolski, Canton, Ohio

[73] Assignee: The Babcock & Wilcox Company, New Orleans, La.

[21] Appl. No.: 421,336

[22] Filed: Apr. 13, 1995

[51] Int. Cl.$^6$ .................................................. B23K 9/04
[52] U.S. Cl. ................... 219/76.14; 219/137 WM
[58] Field of Search ......................... 219/76.1, 137 R, 219/137 WM, 76.12, 76.14, 76.15

[56] References Cited

U.S. PATENT DOCUMENTS

| | | |
|---|---|---|
| 2,299,483 | 10/1942 | Heinrich et al. . |
| 2,904,880 | 9/1959 | McGlynn . |
| 2,965,963 | 12/1960 | Batz et al. . |
| 3,019,327 | 1/1962 | Engel . |
| 3,071,490 | 1/1963 | Pevar . |
| 3,133,184 | 5/1964 | Rienhoff et al. . |
| 3,139,511 | 6/1964 | Kudelko . |
| 3,271,554 | 9/1966 | Johnson . |
| 4,049,186 | 9/1977 | Hanneman et al. . |
| 4,224,360 | 9/1980 | Ohnishi et al. . |
| 4,363,952 | 12/1982 | Ohnishi et al. . |
| 4,624,402 | 11/1986 | Pitcairn et al. . |
| 4,850,524 | 7/1989 | Schick . |
| 5,060,845 | 10/1991 | Svenaga et al. . |

FOREIGN PATENT DOCUMENTS 58-119463  7/1983  Japan ............................. 219/76.1

*Primary Examiner*—Clifford C. Shaw
*Attorney, Agent, or Firm*—Daniel S. Kalka; Robert J. Edwards

[57] ABSTRACT

An improved method for increasing a selected metal composition of a substrate includes plating the selected metal component on the substrate followed by providing a single pass weld overlay with the selected metal containing weld filler metal to increase the metal weld clad deposit.

8 Claims, No Drawings

METHOD FOR MAKING ALLOYING ADDITIONS TO THE WELD OVERLAY WELD POOL

BACKGROUND OF THE INVENTION

1. Field of the Invention

The present invention relates in general to a method for making alloy additions to an overlay weld pool, and in particular to an improved method for increasing a selected metal component composition of a clad layer.

2. Description of the Related Art

The weld overlay process is well-established and has been in commercial-use for many years. Several common welding processes used in weld overlaying include: submerged-arc, conventional or pulsed gas metal arc welding (GMAW), cold or hot wire gas tungsten arc welding (GTAW), shielded metal arc welding (SMAW), flux-core arc welding (FCAW), plasma transferred arc (PTA), laser welding, and electron beam welding. Typical applications include the cladding of tubes, pipes, flanges, and fittings with a corrosion-resistant layer. Additionally, the sealing and wear areas of valves and pumps may be clad for wear resistance.

In the weld overlaying process, generally an arc is established between an electrode and the surface of the metal substrate or workpiece. The arc is used to melt a consumable filler metal and a small amount of substrate to form a weld pool on the surface of the metal workpiece. In addition to conventional arc welding processes, laser or electron beam welding can be used to form a weld pool. The weld pool region is typically protected from oxidation by either using a gaseous shield or vacuum. In the process, the filler metal may also conduct the current to establish and maintain the welding arc (consumable electrode) or it may be separately fed (cold wire) into the arc or weld pool. The form of the filler metal can either be a wire, powder, or strip. The composition of the weld pool is a function of the composition of the filler metal and dilution by the metal component. The resultant corrosion or wear-resistant weld overlay clad layer is generally a function of the weld pool's composition.

Currently, single pass gas metal arc weld cladding uses a 22% to 24% chromium (Cr) weld filler metal and a low carbon steel substrate which results in a 17%–20% chromium deposit. While it is known that the use of multiple pass overlay alloy cladding, for example, U.S. Pat. No. 3,133,184 can be used to produce an increased chromium composition clad layer, the method requires the more costly multiple passes and is limited by the chromium composition of available weld filler metals.

Also, custom composition weld filler metals, for example, U.S. Pat. No. 2,299,483, can be used in producing high chromium content clad layers; however, these filler metals are variable in composition, expensive, and prone to contamination.

Thus, it is desirable to have a method which would increase a selected metal component composition of a clad layer in a single pass weld overlay and not be limited by the composition of suitable weld filler metals. Preferably, the method would use weld filler metals that are readily available, inexpensive, and not as susceptible to contamination. Additionally, clad layers can exhibit a greater selected metal component composition than the weld filler metal used when weld pool dilution is reduced.

SUMMARY OF THE INVENTION

The present invention is directed to solving the aforementioned problems with the prior art as well as others by providing a single pass weld overlay method for increasing a selected metal component in a clad layer. Advantageously, the method of the present invention uses a plated substrate or a workpiece like a chromium-plated substrate and then places a single pass of weld overlay of a chromium containing weld filler metal on the surface of the chromium plated substrate to provide an increased chromium weld clad deposit.

Accordingly, one aspect of the present invention is to provide an improved method for increasing the selected metal component composition of a substrate by using a plated substrate with a single pass weld overlay.

Another aspect of the present invention is to provide a method for increasing the chromium composition of a substrate by using a chromium plated substrate with a single pass of weld overlay of a chromium containing weld filler metal.

The various features of novelty which characterize the invention are pointed out with particularity in the claims annexed to and forming a part of this disclosure. For a better understanding of the invention, its operating advantages the specific aspects attained by its uses, reference is made to the accompanying descriptive matter in which the preferred embodiments of the invention are illustrated.

DESCRIPTION OF THE PREFERRED EMBODIMENTS

The present invention resides in a method for controlling the composition of a weld pool by plating a metal component on the substrate prior to welding. The process of the present invention increases the alloying elements in the weld overlay deposit for improved wear or corrosion-resistance.

While the examples in this application are provided for chromium, it is immediately envisionable that the process of the present invention is applicable to any metal such as nickel for example.

The initial step in the method involves plating a metal substrate with a selected metal component. For example, plating the substrate with chromium results in increased levels of chromium in the weld overlay deposit. An important requirement of the method of the present invention is that the plating adhere to the substrate and not spall-off during subsequent processing.

After plating the substrate, a weld overlay weld pool and resultant alloyed-deposit are formed using normal welding processes such as submerged-arc, conventional or pulsed gas metal arc welding (GMAW), cold or hot wire gas tungsten arc welding (GTAW), shielded metal arc welding (SMAW), flux-core arc welding (FCAW), plasma transferred arc (PTA), laser welding, or electron beam welding. The surface of the plated metal substrate must be free of any volatile contaminants like that required for conventional weld overlaying. During the weld overlaying process, the plating, filler metal, and a portion of the substrate melt to form the weld pool and resultant alloyed-deposit.

Table I lists an example of suitable cladding weld parameters.

TABLE I

| CLADDING PARAMETERS | |
|---|---|
| Gases & Flow Rates => 40 c.f.h. of Helistar | {Argon &} |
| Trailing Shield of Argon @ 55 c.f.h. | {Helium} |
| Osc. Frequency & Width => 9/20" @ 60 $^{cycl.}$/min. | |

TABLE I-continued

CLADDING PARAMETERS

```
Stick Out => 3/4" {5/8" cup to work + 1/8" Tip Recess}
Index => 9/20"
CURRENT => 206 AMPS
VOLTAGE => 30 VOLTS
TRAVEL SPEED => 7.5 i.p.m.
INTERPASS TEMP => 250° F.–350° F.
POWER SUPPLY =>      HOBART ULTRAWELD 500
                     USING SCHEDULE #232
WIRE => 309 LHS   .045" ø
DWELL => LEFT: 1/20 sec. / RIGHT: 1/20 sec.
```

NOTE:
Copper chill blocks were used. And plates were pre-heated to 350° F. before first bead was made on the plate.

Using these parameters, Table II sets forth several examples of a chromium plated carbon steel with the weld clad deposit chemical composition. Reducing weld pool dilution by the substrate will result in clad layer chromium content surpassing the chromium content of the weld filler metal.

TABLE II

| Sample | C | Mn | S | P | Si | Cr | Ni |
|---|---|---|---|---|---|---|---|
| No Cr-Plate | 0.063 | 1.37 | 0.006 | 0.011 | 0.64 | 17.64 | 10.14 |
| 0.002" Cr-Plate | 0.061 | 1.36 | 0.006 | 0.010 | 0.65 | 18.31 | 10.11 |
| 0.003" Cr-Plate | 0.061 | 1.35 | 0.006 | 0.011 | 0.64 | 18.44 | 10.04 |
| 0.005" Cr-Plate | 0.062 | 1.34 | 0.006 | 0.011 | 0.63 | 18.84 | 9.88 |
| 0.010" Cr-Plate | 0.060 | 1.31 | 0.006 | 0.010 | 0.64 | 20.89 | 9.73 |
| 309LHS Weld Filler Metal | 0.015 | 1.63 | 0.002 | 0.014 | 0.82 | 23.06 | 13.52 |
| ASTM A213, TP304 | 0.08 max | 2.00 max | 0.030 max | 0.040 max | 0.75 max | 18.00/ 20.00 | 8.00/ 11.00 |

The method of the present invention provides the following advantages. First, there is increased flexibility in changing the weld overlay weld pool composition. Second, there is improved compositional control of custom alloyed weld clad layers. Third, there is reduced dependency on the metal component in the substrate and filler metal composition to achieve a desired weld pool composition. Fourth, there is a reduced need for high cost custom solid-core filler metals to achieve a desired weld pool composition. Fifth, there is a reduced need for high cost, difficult to control, custom powder-core filler metals to achieve desired weld pool compositions. Sixth, there is a reduced or eliminated need for more than one filler metal feed to achieve desired deposit compositions in using non-consumable electrode weld overlay processes. Finally, there is also a reduced or eliminated need for any cold filler metal feeds to achieve desired deposit compositions for consumable electrode weld overlay processes.

While a specific embodiment of the invention has been shown and described in detail to illustrate the application of the principles of the invention, it will be understood that the invention may be embodied otherwise without departing from such principles.

What is claimed is:

1. An improved method for increasing the chromium content of a clad layer, comprising the steps of:

providing a chromium plated substrate;

placing a single pass of weld overlay of chromium containing weld filler metal on a surface of the chromium-plated substrate to form a weld overlay weld pool with a chromium plating on the chromium plated substrate, the filler metal, and a portion of the substrate; and forming a resultant alloyed deposit to increase the chromium weld clad deposit.

2. An improved method as recited in claim 1, wherein the placing step comprises the step of using a 22–24% Cr weld filler metal.

3. A method as recited in claim 2, wherein the weld filler metal include a 309L weld wire.

4. An improved method as recited in claim 1, wherein the placing step comprises the step of gas metal arc welding the single pass of weld overlay.

5. A method as recited in claim 1, wherein the chromium plated substrate includes chromium plated 1018 carbon steel.

6. A method as recited in claim 5, wherein the chromium plated 1018 carbon steel is about 0.010 inches thick chromium plated.

7. An improved method for increasing a selected metal component composition of a substrate, comprising the steps of:

providing a substrate with a plated layer of a selected metal component to be increased;

placing a single pass weld overlay of a weld filler of the selected metal component on a surface of the plated substrate to form a weld overlay weld pool with a plating on the substrate with the plated layer, the filler metal, and a portion of the substrate; and forming a resultant alloyed deposit for increasing the selected metal component composition on the surface of the substrate.

8. A method as recited in claim 7, wherein the placing step comprises the step of gas metal arc welding the single pass of weld overlay.

* * * * *